United States Patent [19]

Hiraishi et al.

[11] Patent Number: 5,556,351
[45] Date of Patent: Sep. 17, 1996

[54] DIFFERENTIAL APPARATUS

[75] Inventors: Kenji Hiraishi; Shingo Saeki; Kazuyuki Yamazaki; Takao Nakajima, all of Tochigi-ken, Japan

[73] Assignee: Tochigi Fuji Sangyo Kabushiki Kaisha, Japan

[21] Appl. No.: 234,130

[22] Filed: Apr. 28, 1994

[30] Foreign Application Priority Data

Apr. 28, 1993 [JP] Japan ............................ 5-022367 U
Oct. 14, 1993 [JP] Japan ............................ 5-256872

[51] Int. Cl.$^6$ ............................ F16H 48/10; F16H 57/04
[52] U.S. Cl. ........................ 475/160; 475/180; 475/252; 475/344; 74/468; 184/6.12; 29/893.3; 29/893.35; 29/898.1
[58] Field of Search ................ 74/443, 460, 462, 74/464, 468; 475/160, 180, 248, 252, 334, 344; 184/6.12; 29/893.3, 893.32, 893.33, 893.34, 893.36, 898.1

[56] References Cited

U.S. PATENT DOCUMENTS

| | | | |
|---|---|---|---|
| 1,389,720 | 9/1921 | Ward | 74/464 |
| 3,071,314 | 1/1963 | Flanagan | 230/143 |
| 4,777,838 | 10/1988 | Aarestad | 74/462 X |
| 4,954,122 | 9/1990 | Nakao et al. | 475/160 |
| 5,295,923 | 3/1994 | Takefuta | 475/160 X |
| 5,310,389 | 5/1994 | Sato | 74/462 X |

FOREIGN PATENT DOCUMENTS

| | | |
|---|---|---|
| 1105103 | 11/1955 | France . |
| 2126823 | 6/1972 | France . |
| 2553169 | 4/1985 | France . |
| 369548 | 2/1923 | Germany . |
| 1164187 | 2/1964 | Germany ............... 74/462 |
| 2305305 | 8/1974 | Germany . |
| 2848206 | 5/1980 | Germany . |
| 4223374 | 1/1994 | Germany ............... 475/252 |
| 51-144637 | 11/1976 | Japan . |
| 54-54765 | 4/1979 | Japan . |
| 54-69257 | 5/1979 | Japan . |
| 55-3058 | 1/1980 | Japan . |
| 55-64550 | 5/1980 | Japan . |
| 59-141254 | 9/1984 | Japan . |
| 60-81275 | 6/1985 | Japan . |
| 62-200071 | 9/1987 | Japan . |
| 63-130961 | 6/1988 | Japan . |
| 2-38733 | 2/1990 | Japan . |
| 6-58379 | 3/1994 | Japan . |
| 2010145C | 3/1994 | Russian Federation ......... 74/460 |
| 1421933 | 9/1988 | U.S.S.R. ............... 74/460 |
| 1442772 | 12/1988 | U.S.S.R. ............... 74/443 |

Primary Examiner—Charles A. Marmor
Assistant Examiner—Nathan O. Jensen
Attorney, Agent, or Firm—Graham & James LLP

[57] ABSTRACT

A differential apparatus includes a differential casing (21) rotated by an engine drive power; pinion gears (51, 53) slidably and rotatably accommodated in accommodating holes (47, 49) formed in the differential casing (21); a pair of side gears (31, 33) linked with each other via the pinion gears, for transmitting the engine drive power to vehicle wheels differentially; and device (69, 73, 81, 91, 99, 101, 103, 107, 109) for supplying lubricant to sliding surfaces between inner walls of the accommodating holes and the pinion gears.

6 Claims, 10 Drawing Sheets

DIFFERENTIAL APPARATUS

BACKGROUND OF THE INVENTION

1. Field of the Invention

The present invention relates to a differential apparatus for an automotive vehicle.

2. Description of the Related Art

A differential apparatus 201 as shown in FIG. 1 is disclosed in Japanese Published Unexamined (Kokai) Application No. 2-38733. In this differential apparatus 201, a plurality of pairs of pinion gears 211 and 213 are accommodated in a plurality of accommodating holes 205 and 207 of a differential casing 203, respectively. The pinion gears 211 are in mesh with the pinion gears 213. Further, one side gear 217 is in mesh with the pinion gears 211, and the other side gear 219 is in mesh with the pinion gears 213, respectively. In the construction as described above, when differential motion is generated between two vehicle wheels linked with the two side gears 217 and 219, respectively, since the two pinion gears 211 and 213 are rotated under the condition that two tooth crest surfaces of the pinion gears 211 and 213 are brought into sliding contact with the inner wall surfaces of the accommodating holes 205 and 207 respectively, it is possible to generate a differential limiting force due to the frictional resistance generated at the sliding surfaces between both, respectively.

In the conventional differential gear, however, since a large frictional forces is generated between the tooth crest surfaces of the teeth of the pinion gears 211 and 213 and the inner wall surfaces of the accommodating hole 205 and 207 respectively, in case of insufficient lubrication, there exists a problem in that the differential limiting characteristics are not stable because of wear, gall, seizure, abnormal noise, etc. produced at the respective sliding surfaces between the pinion gears and the inner walls of the accommodating holes.

SUMMARY OF THE INVENTION

With these problems in mind, therefore, it is the object of the present invention to provide a differential apparatus by which the sliding surfaces between the pinion gears and the inner wall surfaces of the accommodating holes can be sufficiently lubricated.

To achieve the above-mentioned object, the present invention provides a differential apparatus comprising: a differential casing rotated by an engine drive power; pinion gears slidably and rotatably accommodated in accommodating holes formed in said differential casing; a pair of side gears linked with each other via said pinion gears, for transmitting the engine drive power to vehicle wheels differentially; and devices for supplying lubricant to sliding surfaces between inner walls of the accommodating holes and the pinion gears. The devices are formed at tooth crests of the pinion gears, respectively.

In the differential apparatus according to the present invention, since oil grooves are formed at the tooth crests of the pinion gears, respectively, it is possible to supply lubricating oil sufficiently to the sliding surfaces between the tooth crests of the pinion gears and the inner walls of the accommodating holes. Further, this lubricating oil supply effect can be promoted by the centrifugal force of the revolutions of the pinion gears. Consequently, it is possible to prevent the sliding surfaces between both from wear, gall, seizure, abnormal noise, etc., so that the differential limiting characteristics can be stabilized.

DETAILED DESCRIPTION OF THE PREFERRED EMBODIMENTS

Figure 1:
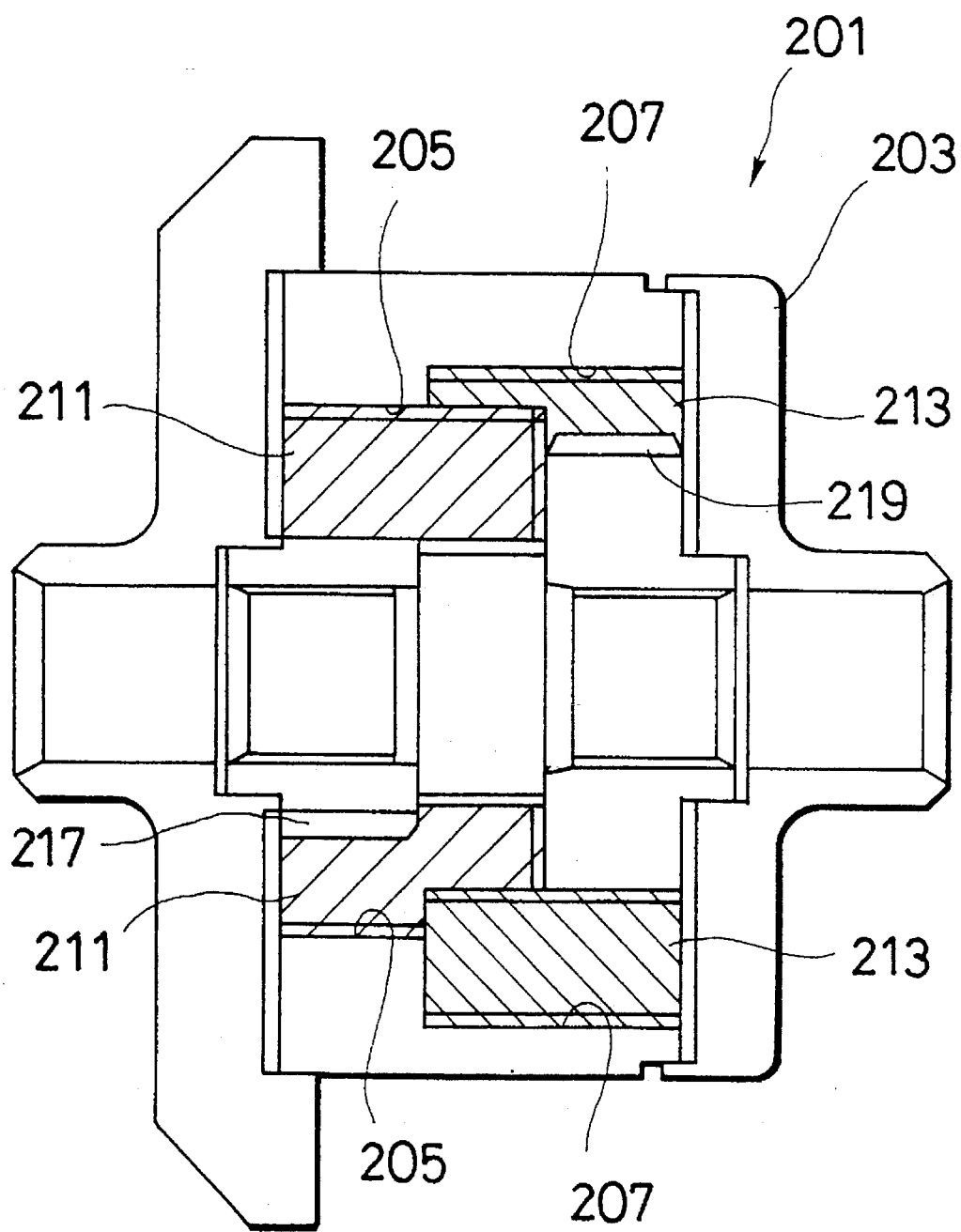
FIG. 1 is a cross-sectional view showing an example of conventional differential apparatus.
Figure 2:
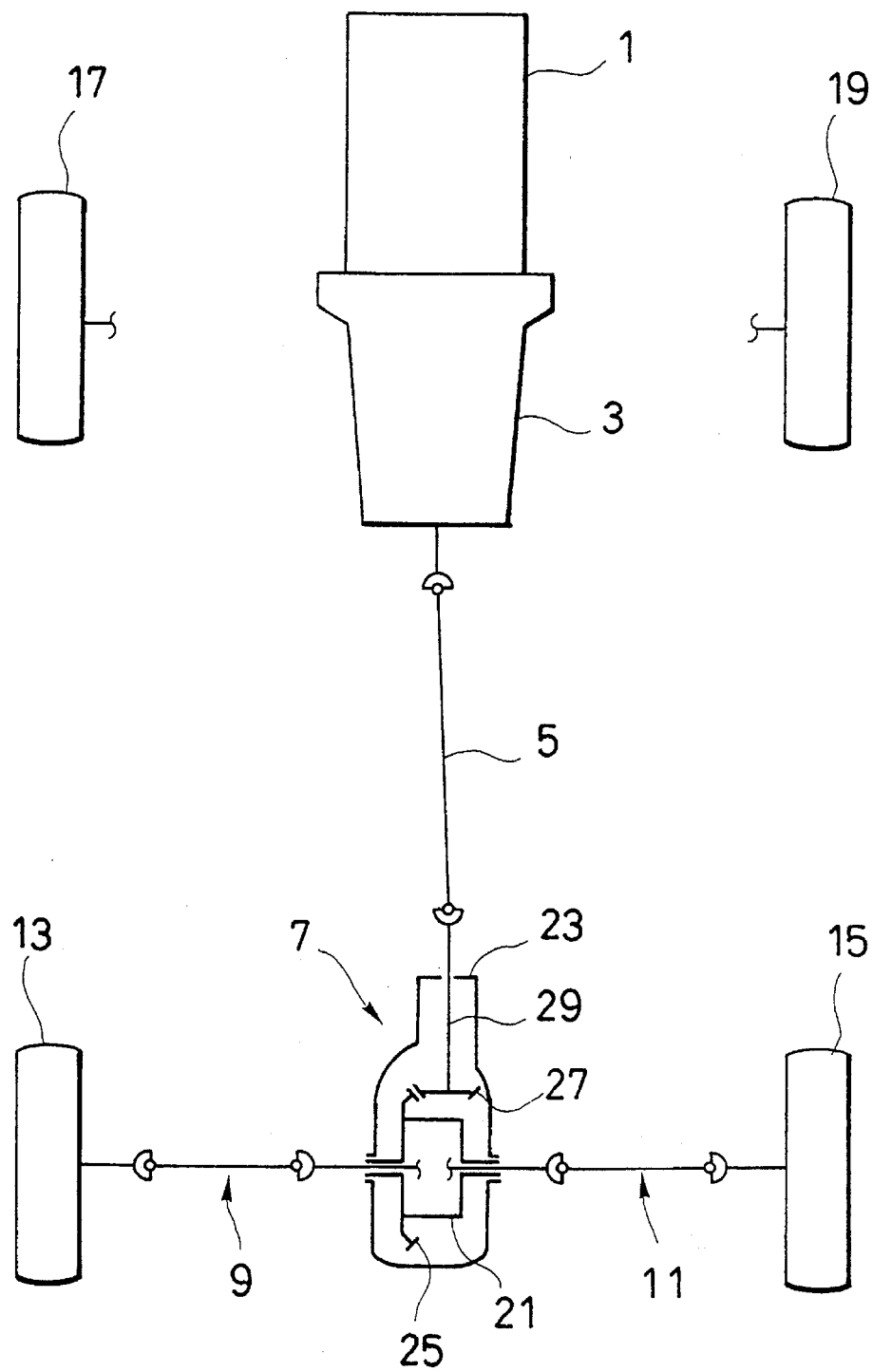
FIG. 2 is a skeletal diagram showing a vehicle power system to which the differential apparatus according to the present invention is applied.
Figure 3:
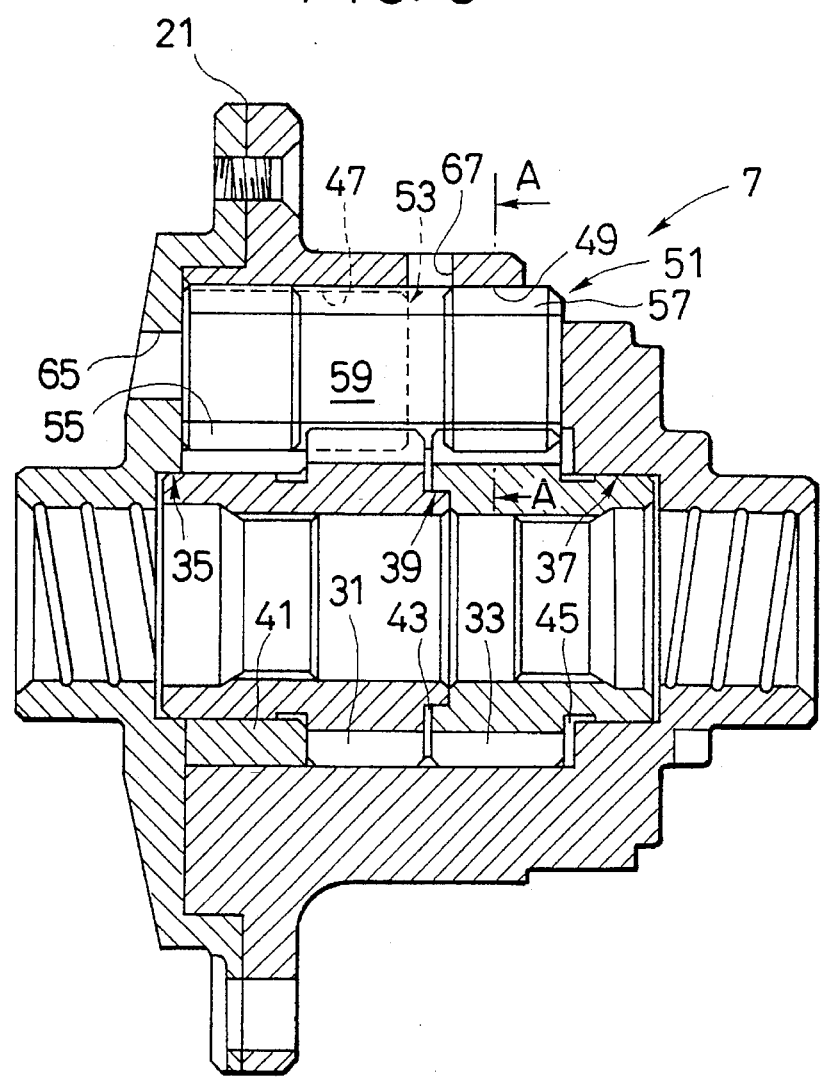
FIG. 3 is a cross-sectional view showing a differential apparatus according to the present invention.

Embodiments of the present invention will be described hereinbelow with reference to the attached drawings. FIG. 2 shows a vehicle power system to which the differential apparatus according to the present invention is applied; and FIG. 3 shows the differential apparatus according to the present invention. The right and left directions shown in FIGS. 2 and 3 correspond to the right and left directions of the vehicle, the differential apparatus, and the pinion gears shown in FIGS. 5 and 6, respectively.

As shown in FIG. 2, the vehicle is composed of an engine 1, a transmission 3, a propeller shaft 5, a rear differential apparatus 7 (arranged on the rear wheel side) to which the differential apparatus according to the present invention is applied, rear wheel shafts 9 and 11, right and left rear wheels 13 and 15, right and left front wheels 17 and 19, etc. A differential casing 21 of the rear differential apparatus 7 is arranged within a differential carrier 23, and a ring gear 25 is fixed to the differential casing 21. The ring gear 25 is in mesh with a drive pinion gear 27 formed integral with a drive pinion shaft 29 linked with the propeller shaft 5. In the construction as described above, when the engine 1 is driven, a driving force is transmitted to the differential casing 21 via the transmission 3 and the propeller shaft 5 to rotate the differential casing 21. Further, lubricating oil is sealed within the differential carrier 23, and in addition an oil sump is formed therewithin.

Figure 4:
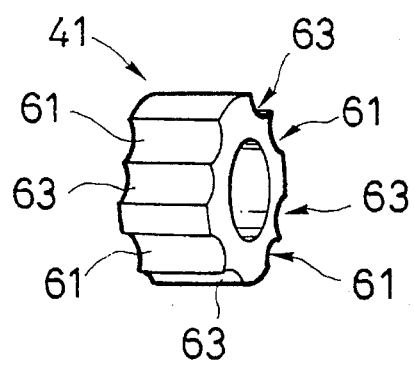
FIG. 4 is a perspective view showing a sleeve incorporated in the differential apparatus shown in FIG. 3.

With reference to FIG. 3, right and left helical side gears 31 and 33 are arranged within the differential casing 21. These side gears 31 and 33 are rotatably supported by bearing portions 35 and 37 formed within the differential casing 21. These side gears 31 and 33 are supported each other by mutual supporting portions 39 formed between the free ends thereof so as to be centered with respect to each other. A sleeve 41 as shown in FIG. 4 is arranged between the left side gear 31 and the differential casing 21. The left side gear 31 is spline-linked with the left rear wheel shaft 9 and the right side gear 33 is spline-linked with the right rear wheel shaft 11. A washer 43 is interposed between the two side gears 31 and 33, and another washer 45 is interposed between the side gear 33 and the differential casing 21.

The differential casing 21 is formed with four-sets of accommodating holes 47 and 49 so as to be arranged along the circumferential direction of the differential casing 21. In each of these accommodating holes 47 and 49, a pair of long helical pinion gear 51 and a short helical pinion gear 53 are rotatably and slidably accommodated, respectively.

Figure 5:
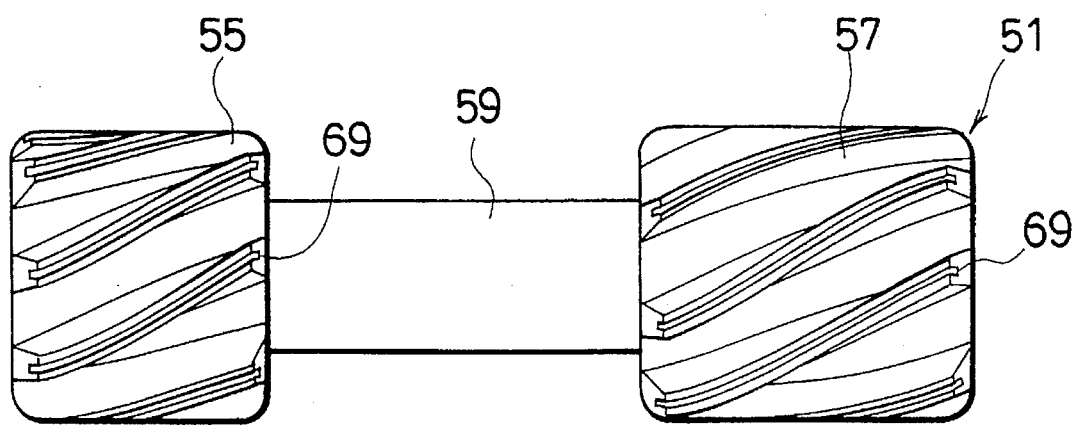
FIG. 5 is a front view showing one pinion gear incorporated in the differential apparatus shown in FIG. 3, in which a first embodiment of the oil grooves is shown.
Figure 6:
FIG. 6 is a front view showing the other pinion gear incorporated in the differential apparatus shown in FIG. 3, in which the same first embodiment of the oil grooves is shown.
Figure 7:
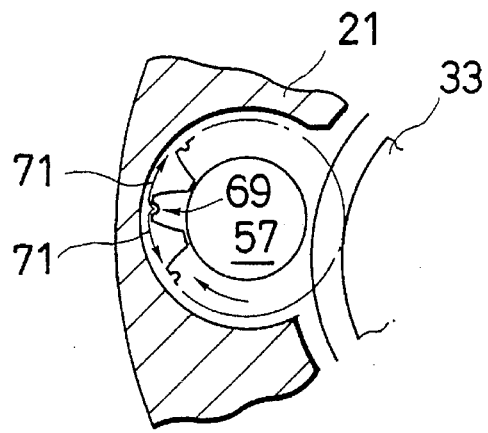
FIG. 7 is a partial cross-sectional view taken along the line A—A in FIG. 3.
Figure 8:
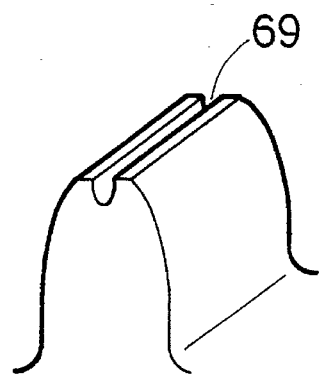
FIG. 8 is an enlarged perspective view showing a tooth of the pinion gear, in which the first embodiment of the oil groove is shown.

As shown in FIG. 5, the long pinion gear 51 is composed of a first gear portion 55, a second gear portion 57, and a small-diameter shaft portion 59 for connecting both the gear portions 55 and 57. The second gear portion 57 is in mesh with the side gear 33. On the other hand, the short pinion gear 53 as shown in FIG. 6 is in mesh with the first gear portion 55 at the left end thereof and also with the side gear 31 at the right end thereof. Further, as shown in FIG. 4, the sleeve 41 is formed with a plurality of recessed portions 61 and 63 so as to form part of the accommodating holes 47 and 49, respectively.

As shown in FIG. 3, the differential casing 21 is formed with two openings 65 and 67 communicating with the accommodating holes 47 and 49 respectively, through which lubricating oil flows from the oil sump of the differential carrier 23 to the accommodating holes 47 and 49.

A first embodiment of the oil grooves will be described hereinbelow with reference to FIGS. 5, 6, 7, and 8. An oil groove 69 is formed at the middle of the tooth crest and along the tooth trace of each of the teeth of the pinion gears 51 and 53, respectively. Accordingly, the lubricating oil flowing into the accommodating holes 47 and 49 can be introduced all over the sliding surfaces between the tooth crests of the pinion gears and the inner wall surfaces of the accommodating holes 47 and 49 through these oil grooves 69 formed at the tooth crests of the pinion gears 51 and 53, respectively. In addition, the introduced lubricating oil can be spread over the sliding surfaces, as shown by the arrows 71 shown in FIG. 7, by centrifugal forces generated by the revolutions of the pinion gears both around the axis of the differential casing 21 and their own axes, respectively.

Consequently, it is possible to prevent the wear, gall, seizure, noise, etc. between the pinion gears 51 and 53 and the wall surfaces of the accommodating holes 47 and 49 and thereby to stabilize the frictional force generated at the sliding surfaces between the two. The lubricating oil used for lubrication is discharged mainly from the opening 67 and further returned into the oil sump of the differential carrier 23 by the revolution of the differential casing 21.

Owing to the construction of the rear differential apparatus as described above, when the differential casing 21 is rotated by the engine 1, the engine driving power is distributed into the right and left rear wheels 13 and 15 via the pinion gears 51 and 53 and the side gears 31 and 33, respectively. Further, when a difference in driving resistance is produced between the right and left rear wheels, the engine driving force can be distributed differentially into the right and left rear wheels on the basis of the revolutions of the pinon gears 51 and 53.

While the engine torque is being transmitted, since the tooth crests of the tooth of the pinion gears 51 and 53 are brought into tight contact with the inner wall surfaces of the accommodating holes 47 and 49 due to reaction forces generated between the pinion gears 51 and 53 and the side gears 31 and 33, frictional forces are generated thereat. In addition, the respective side gears 31 and 33 and the pinion gears 51 and 53 are all brought into tight contact with the differential casing 21, the washers 43 and 45, and the sleeve 41 due to the thrust forces generated by the gearing portions between the helical teeth of the pinion gears, frictional forces are also generated. Owing to these frictional forces, the revolutions of the respective side gears 31 and 33 and the pinion gears 51 and 53 are braked so that the differential motion between the two side gears 31 and 33 can be limited. This differential limiting force increases with increasing engine torque.

The oil grooves 69 formed in the pinion gears 51 and 53 supply the lubricating oil not only to the contact surfaces between the pinion gears and the inner wall surfaces of the accommodating holes to reduce the frictional resistance generated thereat, but also to the contact surfaces between the side gears 31 and 33 and the inner wall surfaces of the accommodating holes and the gearing portions between the pinion gears 51 and 53 and the side gears 31 and 33. Therefore, it is possible to stabilize the frictional forces and the gearing forces thereof, with the result that it is possible to stabilize the differential limiting characteristics.

In FIG. 2, when the vehicle is running on a muddy road and thereby one of the rear wheels 13 and 15 is rotated being idled, since a large torque can be applied to both the rear wheels, it is possible to transmit a large driving torque to the other of the rear wheels due to the differential limiting force, so that the high travel characteristics can be obtained on the muddy road. Further, when the vehicle is running on a paved road, the steering characteristics and stability can be both improved due to an appropriate differential limiting force, so that it is possible to obtain stable and smooth traveling and turning characteristics.

Figure 9:
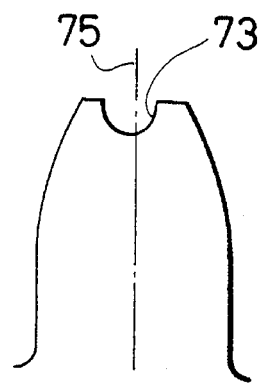
FIG. 9 is an enlarged side view showing a tooth of the pinion gear, in which a modification of the first embodiment of the oil groove is shown.

In the first embodiment as described above, since the oil groove 69 is formed on the tooth crest of each of teeth of the pinion gears 51 and 53, respectively, whenever the pinion gears 51 and 53 are rotated in any of the vehicle frontward and rearward directions, the oil supply effect can be kept uniform. However, when an oil supply effect is required to be increased in a specific rotational direction (e.g., frontward travel), the oil groove 73 is formed at the tooth crest being displaced toward one side asymmetrically in circular thickness direction of the tooth (away from the central line 75 of the tooth), as shown in FIG. 9.

Figure 10:
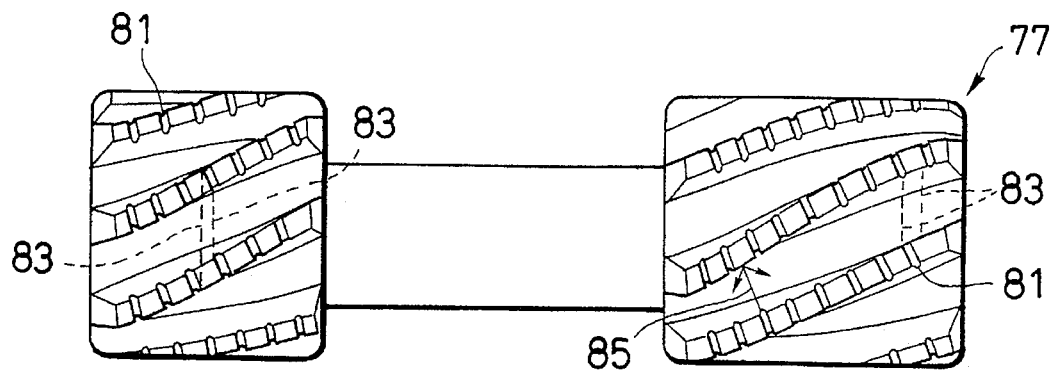
FIG. 10 is a front view showing the teeth of one pinion gear, in which a second embodiment of the oil grooves is shown.
Figure 11:
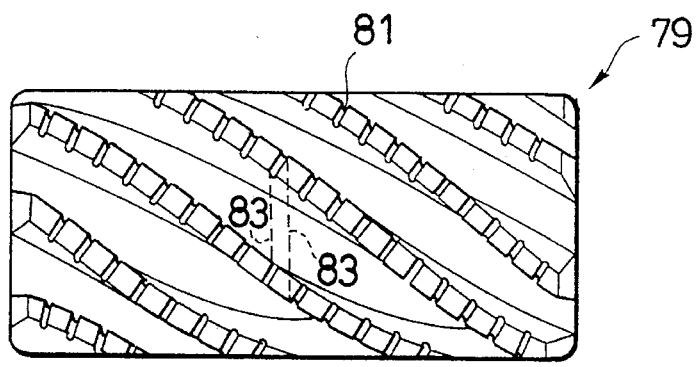
FIG. 11 is a front view showing teeth of the other pinion gear, in which the second embodiment of the oil grooves is shown.
Figure 12:
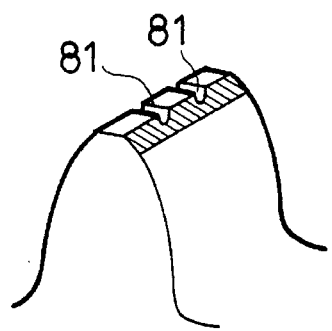
FIG. 12 is a perspective view showing a tooth of the pinion gear, in which the same second embodiment of the oil grooves is shown as a modification for improvement.

A second embodiment of the present invention will be described hereinbelow with reference to FIGS. 10 to 14. In this second embodiment, a plurality of oil grooves 81 are formed at the tooth crests substantially perpendicular to the tooth trace directions of the teeth of both long and short pinion gears 77 and 79, respectively. As depicted in FIGS. 10 and 11, the two adjacent oil grooves 81 are so formed as not to be overlapped with each other in the rotational direction of the pinion gear, as shown by dashed lines 83, so that the lubricant oil can be supplied all over the sliding surfaces between the pinion gears and the inner wall surfaces of the accommodating holes. In addition, as shown by the arrow 85 in FIG. 10, when the pinion gears 77 and 79 are rotated, since the oil guided along the oil groove 81 is spread by the tooth surface (at which no oil groove 81 is formed), it is possible to further increase the lubrication effect. In this second embodiment, high and uniform oil supplying effect can be obtained in both the rotational directions of the pinion gears 77 and 79. Further, in FIG. 12, the tooth face end portions (shaded portions) from the tooth crest to a depth of said oil groove are cut away (referred to as semi-top processing) to be recessed from a theoretical tooth face that is determined by a theoretical tooth shape for example the involute gear tooth, so that the gears starts to contact with each other beginning from the tooth face portions at which the oil grooves 81 are formed, thus further improving the lubrication.

Figure 13:
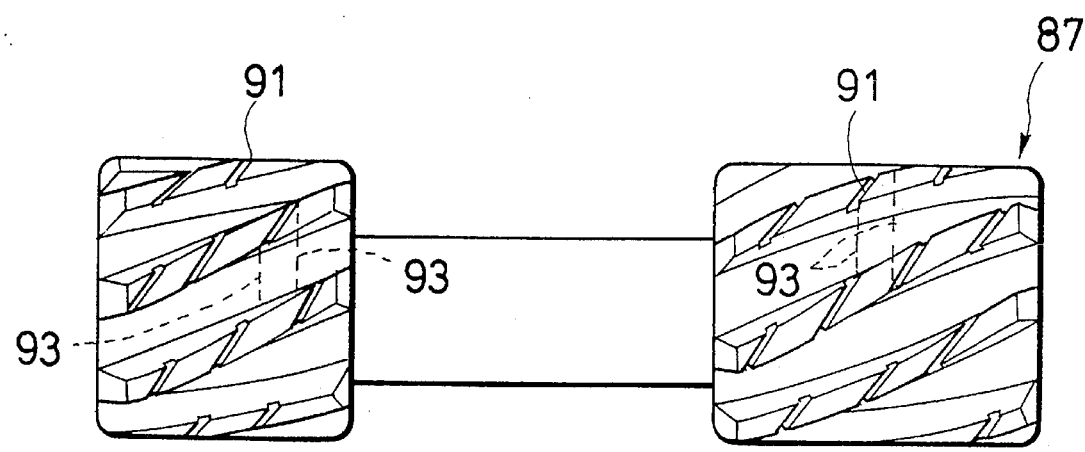
FIG. 13 is a front view showing the teeth of one pinion gear, in which a modification of the second embodiment of the oil grooves is shown.
Figure 14:
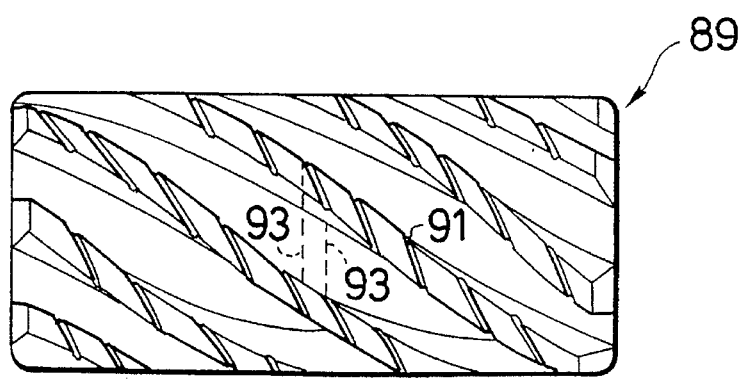
FIG. 14 is a front view showing teeth of the other pinion gear, in which the same modification of the second embodiment of the oil grooves is shown.

FIGS. 13 and 14 show a modification of the second embodiments, in which a plurality of oil grooves 91 are formed at the tooth crests at an appropriate oblique angle (other than the right angles) with respect to the tooth trace directions of the teeth of both long and short pinion gears 87 and 89, respectively. In this modification, the two adjacent oil grooves 91 are so formed as not to be overlapped with each other in the rotational direction of the pinion gears, as shown by dashed lines 93, so that the lubricant oil can be supplied all over the sliding surfaces between the pinion gears and the inner wall surfaces of the accommodating holes. In this second embodiment, high and uniform oil supplying effect can be obtained in both the rotational directions of the pinion gears 87 and 89.

Figure 15:
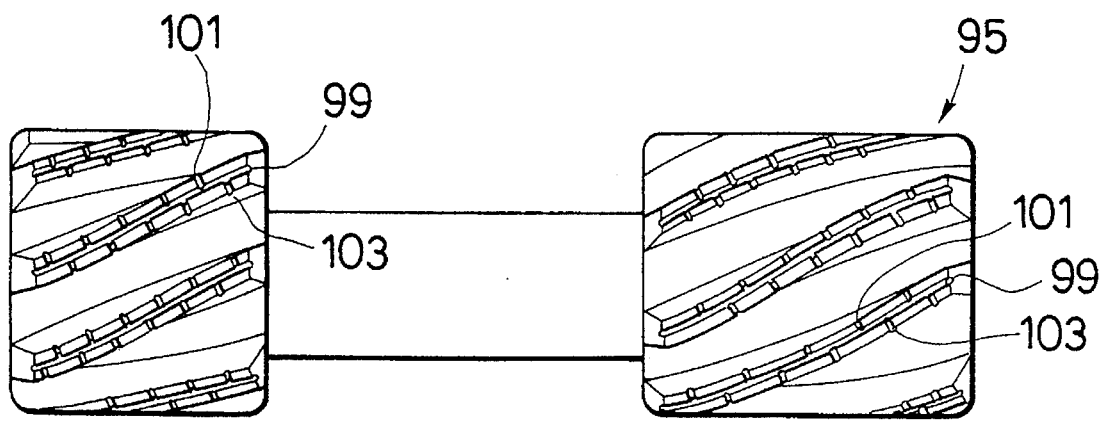
FIG. 15 is a front view showing the teeth of one pinion gear, in which a third embodiment of the oil grooves is shown.
Figure 16:
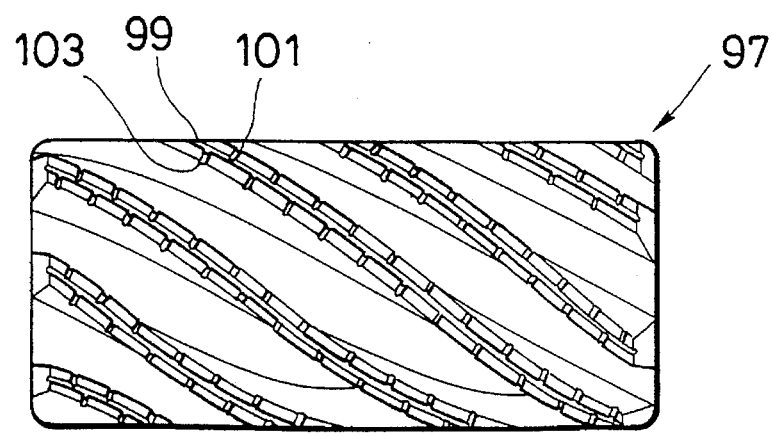
FIG. 16 is a front view showing teeth of the other pinion gear, in which the third embodiment of the oil grooves is shown.

FIGS. 15 and 16 show a third embodiment of the present invention. In this third embodiment, the oil grooves 99 are formed at the middle of the tooth crests and along the tooth trace directions of each of the teeth of both the long and short pinion gears 95 and 97 (as in the first embodiment). In addition, a plurality of oil grooves 101 and 103 are formed substantially perpendicular to the tooth trace directions being arranged alternately on both the sides of and along the oil grooves 99 extending in the tooth trace directions so as to communicate with the oil groove 99. Therefore, in this embodiment, it is possible to lubricate all over the sliding surfaces between the pinion gears and the wall surfaces of the accommodating holes in both the rotational directions. Further, in this embodiment, since the area of the oil grooves is broad in total, the amount of oil flowing therethrough and held thereat is relatively large, so that it is possible to obtain a higher lubricating effect to that extent.

Figure 17:
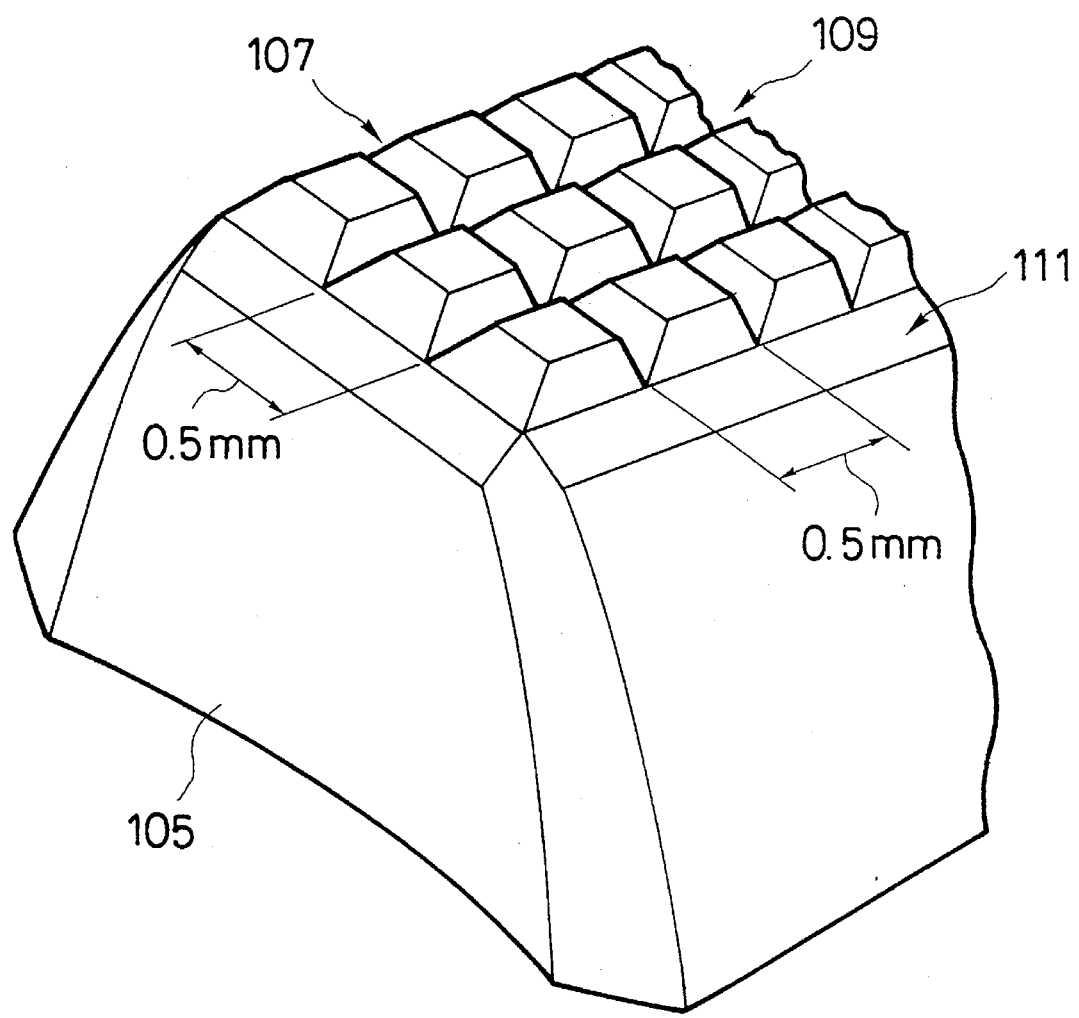
FIG. 17 is an enlarged view showing a tooth of the pinion gear, in which a fourth embodiment of the oil grooves is shown.

FIG. 17 shows a fourth embodiment, in which the tooth end 105 of each tooth of the pinion gear is knurled into a mesh pattern. The mesh pattern is formed by two groups of oil grooves 107 and 109 extending in two mutually-intersecting directions, respectively. Further, as shown by an arrow 111 in FIG. 17, the tooth face end portion is semi-top processed. Preferably, these oil grooves 107 and 109 are formed at intervals of about 0.5 mm and in a depth of 0.02 to 0.2 mm.

In this fourth embodiment, since the oil grooves 107 and 109 are formed into a mesh pattern, the oil holding characteristics can be improved (i.e., the oil shortage can be further prevented), so that it is possible to obtain a high oil supply effect to the sliding surfaces in both rotational directions by reducing the fluctuations in oil thickness. In this embodiment, the abnormal noise can be prevented effectively, in addition to the lubrication effect at the respective sliding surfaces.

The best effect can be obtained when the mesh intervals are 0.5 mm. However, there exists an effect when the mesh intervals are determined within a range from about 0.3 to 1.0 mm. Further, the slopes of the respective oil grooves for forming the mesh are not specified (the right angles or the oblique angles), and in addition the angle between the oil grooves and the tooth trace directions and the angle between the oil grooves and the rotational directions of the pinion gears can be determined freely.

Figure 18:
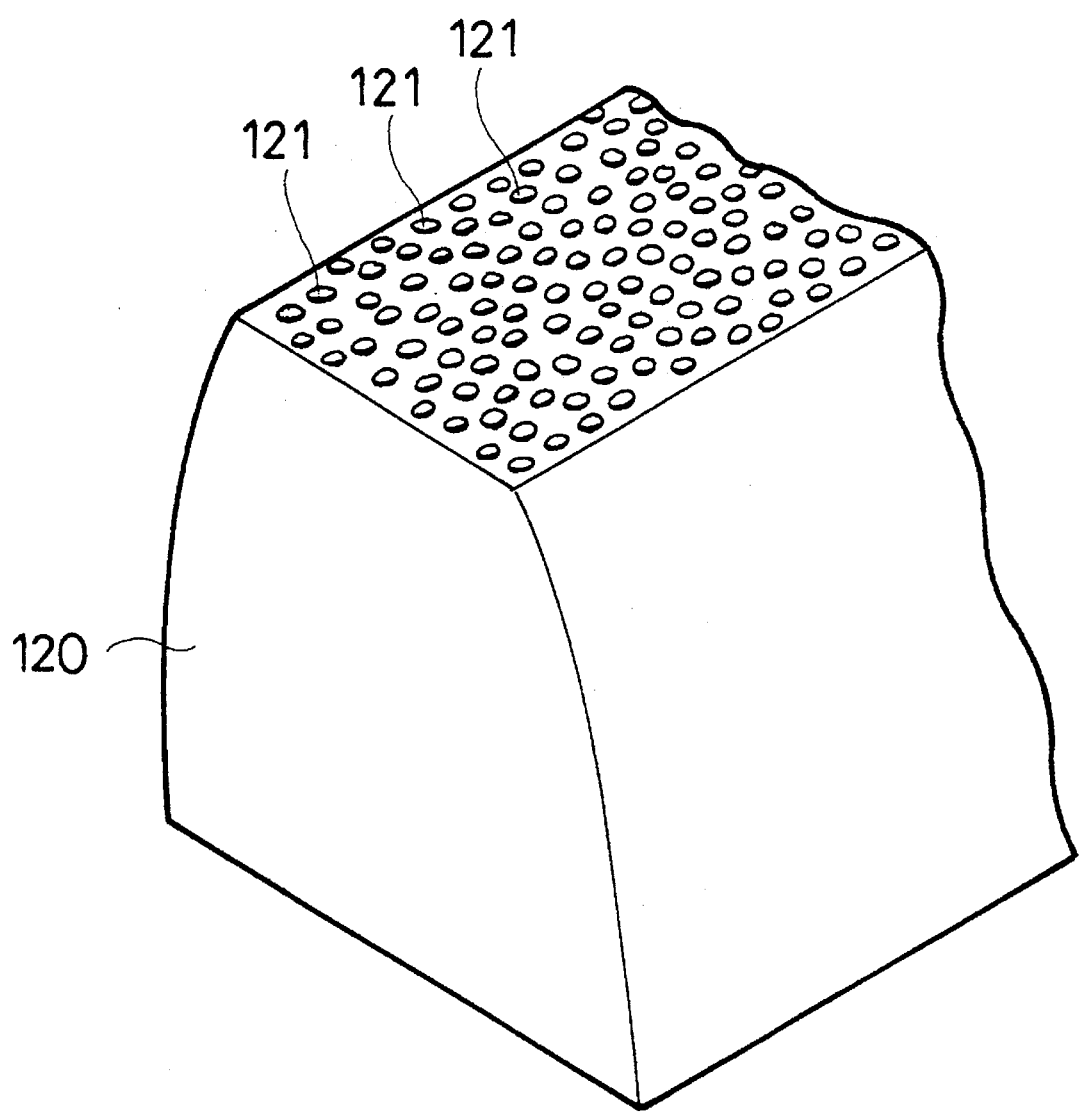
FIG. 18 is an enlarged view showing a tooth of the pinion gear, in which the tooth crest has several recesses processed by shot peening.

Further, in a modification of this embodiment, in the case where the oil grooves with a surface roughness of about 10 to 25 μm are formed with a lathe, it is possible to obtain the same oil holding and abnormal noise prevention effects as with the case of the other embodiments. Further, as FIG. 18 shows when the tooth crests of the teeth 120 of the gears have a lot of recess 121 processed by shot peening so as to hold lubricating oil, it is possible to obtain the same effects.

As described above, in the differential apparatus according to the present invention, since the oil grooves are formed at the tooth crests of the pinion gears (accommodated in the accommodating holes of the differential casing so as to be meshed with the side gears), sufficient lubricating oil can be supplied to the sliding surfaces between the inner wall surfaces of the accommodating holes and the gears. Accordingly, it is possible to prevent wear, gall, seizure, abnormal noise, etc., thus stabilizing the differential limiting characteristics of the differential apparatus.

What is claimed is:

1. A differential apparatus, comprising:

a differential casing rotated by an engine drive power;

pinion gears slidably and rotatably accommodated in accommodating holes formed in said differential casing;

a pair of side gears linked with each other via said pinion gears, for transmitting the engine drive power to vehicle wheels differentially; and means for supplying lubricant to sliding surfaces between inner walls of the accommodating holes and said pinion gears, said means including oil grooves formed into a mesh pattern at tooth crests of said pinion gears.

2. The differential apparatus of claim 1, wherein said oil grooves further comprise first oil grooves extending in tooth trace directions and second oil grooves extending at an angle with respect to the tooth trace directions of the teeth of said pinion gears.

3. The differential apparatus of claim 1, wherein intervals of said oil grooves are from 0.2 to 1.0 mm.

4. The differential apparatus of claim 1, wherein a depth of said oil grooves is from 0.02 to 0.2 mm.

5. The differential apparatus of claim 1, wherein said oil grooves are formed by knurling.

6. The differential apparatus of claim 1, wherein tooth faces of said pinion gears from the tooth crest to a depth of said oil grooves are recessed from a theoretical tooth face that is determined by a theoretical tooth shape.

* * * * *